(12) United States Patent
Ravichandran et al.

(10) Patent No.: US 10,776,417 B1
(45) Date of Patent: Sep. 15, 2020

(54) PARTS-BASED VISUAL SIMILARITY SEARCH

(71) Applicant: A9.com, Inc., Palo Alto, CA (US)

(72) Inventors: Avinash Aghoram Ravichandran, Shoreline, WA (US); Michael Quang Thai Lam, Corvallis, OR (US); Rahul Bhotika, Bellevue, WA (US)

(73) Assignee: A9.COM, INC., Palo Alto, CA (US)

( * ) Notice: Subject to any disclaimer, the term of this patent is extended or adjusted under 35 U.S.C. 154(b) by 122 days.

(21) Appl. No.: 15/866,231

(22) Filed: Jan. 9, 2018

(51) Int. Cl.
| | | |
|---|---|---|
| *G06Q 30/00* | (2012.01) | |
| *G06F 16/583* | (2019.01) | |
| *G06Q 30/06* | (2012.01) | |
| *G06N 5/04* | (2006.01) | |
| *G06K 9/66* | (2006.01) | |
| *G06N 3/02* | (2006.01) | |
| *G06F 16/532* | (2019.01) | |

(52) U.S. Cl.
CPC ........ *G06F 16/5838* (2019.01); *G06F 16/532* (2019.01); *G06K 9/66* (2013.01); *G06N 3/02* (2013.01); *G06N 5/046* (2013.01); *G06Q 30/0629* (2013.01)

(58) Field of Classification Search
None
See application file for complete search history.

(56) References Cited

U.S. PATENT DOCUMENTS

| | | | | |
|---|---|---|---|---|
| 8,949,252 | B2 * | 2/2015 | Chittar | G06Q 30/00 707/749 |
| 8,990,199 | B1 * | 3/2015 | Ramesh | G06F 16/5854 707/736 |
| 9,830,534 | B1 * | 11/2017 | Ravichandran | G06K 9/00671 |
| 9,881,226 | B1 * | 1/2018 | Rybakov | G06K 9/46 |
| 10,083,521 | B1 * | 9/2018 | Dhua | G06K 9/4652 |
| 10,109,051 | B1 * | 10/2018 | Natesh | G06K 9/4652 |
| 10,140,515 | B1 * | 11/2018 | Waldo | G06K 9/00684 |
| 10,282,431 | B1 * | 5/2019 | Bhotika | G06F 16/5838 |
| 2008/0082426 | A1 * | 4/2008 | Gokturk | G06Q 30/0623 705/26.62 |
| 2008/0177640 | A1 * | 7/2008 | Gokturk | G06Q 30/0603 705/26.62 |
| 2008/0212899 | A1 * | 9/2008 | Gokturk | G06Q 30/0603 382/305 |
| 2013/0084002 | A1 * | 4/2013 | Bhardwaj | G06K 9/4642 382/165 |

(Continued)

*Primary Examiner* — Iman K Kholdebarin
(74) *Attorney, Agent, or Firm* — Hogan Lovells US LLP

(57) ABSTRACT

Various embodiments provide for visual similarity based search techniques that certain desirable visual attributes of one or more items to search for items having similar visual attributes. In order to create an electronic catalog of items that is searchable by parts-based visual attributes, the visual attributes are identified and corresponding feature vectors are extracted from the image data of each item. Thus, feature values of parts-based visual attributes of items in the electronic catalog can be determined and used to select or rank the items in response to a search query based on desirable visual attributes. To conduct a search, a user may define desirable visual attributes of one or more items. The feature vectors of the desirable visual attributes are determined and used to query the electronic catalog of items, in which items having visual attributes of similar feature vectors are selected and returned as search results.

20 Claims, 10 Drawing Sheets

(56) References Cited

U.S. PATENT DOCUMENTS

| | | | | |
|---|---|---|---|---|
| 2015/0169740 A1* | 6/2015 | Gunderson | ............. | G06F 16/27 |
| | | | | 707/749 |
| 2016/0275518 A1* | 9/2016 | Bowles | ................ | G06K 9/6215 |
| 2016/0350336 A1* | 12/2016 | Checka | ................ | G06K 9/4628 |
| 2018/0181569 A1* | 6/2018 | Jarr | .................... | G06Q 30/0603 |

* cited by examiner

PARTS-BASED VISUAL SIMILARITY SEARCH

BACKGROUND

With the expanding use of computer networks, such as the Internet, an increasing amount of commerce is conducted electronically. For example, consumers are increasingly utilizing electronic marketplaces to purchase clothing and other apparel items. Countless apparel items are for sale online, and being able to search quickly and efficiently for and apparel item is increasingly important, not only for online retailers who wish to sell their products, but for consumers who are looking to find a specific apparel item quickly. Generally, users often rely upon search queries or keyword strings that can be used to identify potentially relevant content. In many instances, however, the relevance depends at least in part to the actual query that was submitted, as well as the way in which the potentially relevant content is categorized or identified. There often is no easy way for a user to modify a query to express a desired refinement, and no accurate way for that expression to be implemented so as to locate the content of interest. This is particularly true for certain visual attributes that are difficult to quantify through existing keyword-based approaches.

BRIEF DESCRIPTION OF THE DRAWINGS

Various embodiments in accordance with the present disclosure will be described with reference to the drawings, in which.

DETAILED DESCRIPTION

Figure 1A:
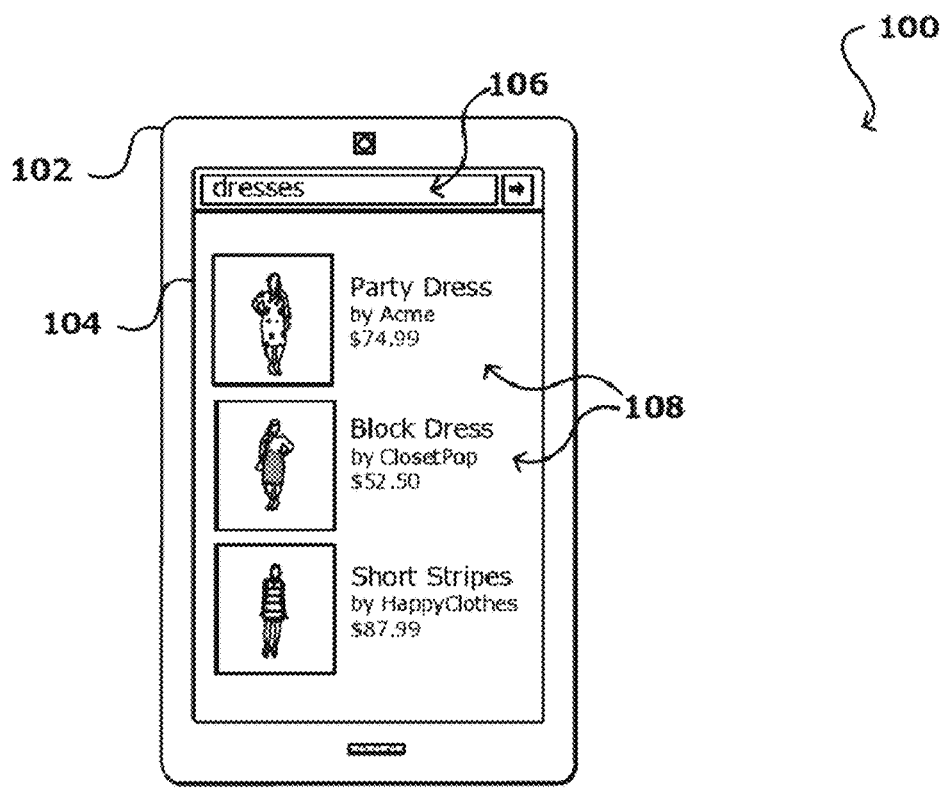
FIG. 1A-1B illustrates an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for providing content in an electronic environment. In particular, various embodiments provide for visual similarity based search techniques that certain desirable visual attributes of one or more items to search for items having similar visual attributes.

In various embodiments, an electronic catalog of items may include image data, text descriptions, and other metadata associated with individual items in the electronic catalog. The image data associated with an individual item may be rendered to provide a visual representation of the item. Thus, visual attributes of the item may be extracted from the image data and such a catalog of items may be trained to be searchable based on visual attribute similarity. In various embodiments, visual attributes of an item may include certain defined parts of an item. For example, parts-based visual attributes for a dress may include neckline, sleeve style, hemline, silhouette, color, pattern, occasion, and the like.

In order to create an electronic catalog of items that is searchable by parts-based visual attributes, the visual attributes are identified and extracted from the image data of each item. Specifically, in some embodiments, the image data for each item can be analyzed using a localization process or other such process to identify the portions of the image that correspond to the respective visual attributes. For example, the image data of an apparel item may be an image of a person wearing the apparel item, and a trained object detection algorithm or a spatial relation approach can be utilized in through which body parts or other features are identified in the image that can then be used to determine the a patch region of the image where a certain attribute is likely represented. For example, such a localization technique may be used to identify the location of a nose and shoulders in the image, and thus be able to approximate a patch of the image corresponding to the neckline attribute of the item. The patches of the image that correspond to the respective visual attributes can then be processed using various feature extraction techniques to determine the feature values (e.g., feature vector) of the respective visual attributes. Thus, feature values of parts-based visual attributes of items in the electronic catalog can be determined and used to select or rank the items in response to a search query based on desirable visual attributes.

To conduct a search using parts-based visual attributes, a user may define desirable visual attributes of one or more items. The feature values of the desirable visual attributes are determined and used to query the electronic catalog of items, in which items having visual attributes of similar feature values are selected and returned as search results. For example, a user may select the neckline of a first dress and the color of a second dress as the desirable visual attributes. The neckline attribute feature value of the first dress and the color attribute feature value of the second dress may be compared, respectively, to the neckline attribute feature values and color attribute values of the catalog of items to find the items that have similar neckline and color attributes. The items may be returned and displayed as the search result. In some embodiments, the items may be ranked based on similarity scores for each attribute, which may be weighed according to a weighting function.

Various other features and application can be implemented based on, and thus practice, the above described technology and presently disclosed techniques. Accordingly, approaches in accordance with various embodiments improve the operation and performance of the computing device(s) on which they are implemented by enabling the computing systems to generate precision data (e.g., feature vectors) using computer vision, and utilize such data to produce search results. Conventionally, search system rely on user-defined labels to filter for items. For example, a user may label a certain item in an electronic catalog as have the color attribute value "red", the neckline attribute value of "crew neck", etc. This operation and performance of computing systems under such techniques are fundamentally limited to the amount and particular structure of user-provided data. In contrast, the present techniques enable computing system to generate additional data regarding an item, beyond user-provided labels, and even beyond what can be accurately described by human annotators or through human language. Machine generated precision data such as feature vectors can represent image data in ways no human can possibly generate, and can only be extracted using computing devices, and more specifically computing devices specially equipped with machine learning capabilities. Additionally, not only are computing devices indispensable to the generation of precision data such as feature vectors, but such data is also only readable by and meaningful to computing devices. Thus, the systems and methods described herein are fundamentally tied to computing machines and provide improvements to computing technology. Various other applications, processes, and uses are presented below with respect to the various embodiments, each of which improves the operation and performance of the computing device(s) on which they are implemented.

Figure 1B:
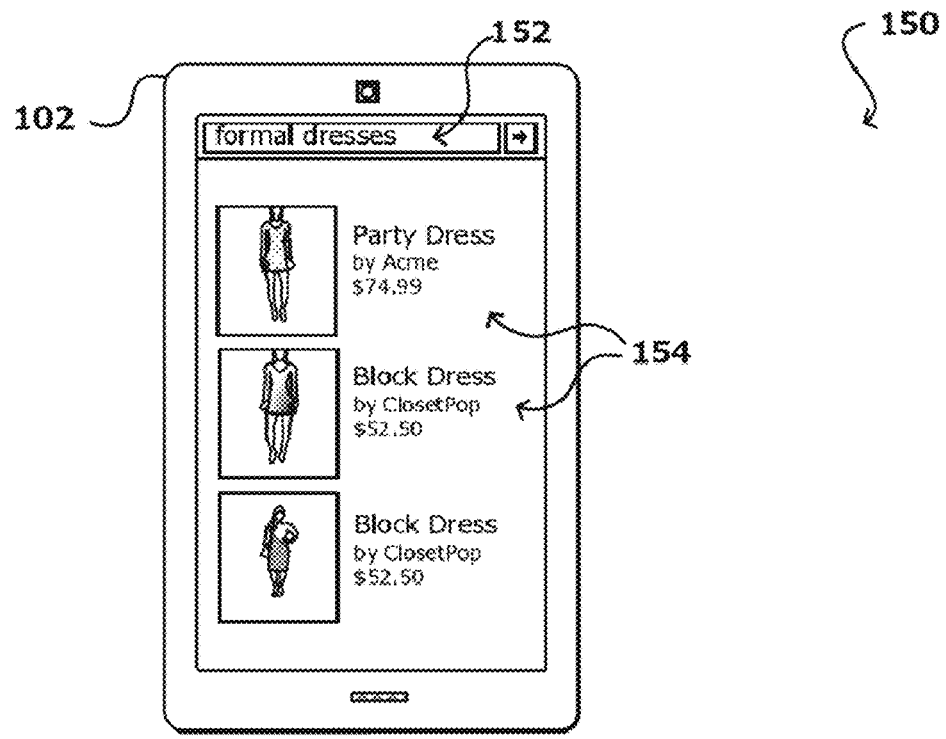

FIGS. 1A and 1B illustrate an example 100 computing device 102 providing access to an electronic marketplace 104, in accordance with various embodiments. In this example, although a tablet computing device is shown in this example, it should be understood that various other types of electronic device that are capable of determining and processing input can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface 106 that enables a user to search for a desired item. The search interface may return search results based on relevance of particular items to the customer's search query. For example, FIG. 1A illustrates an example display of content on a display screen 104 of a computing device 102. In this example a search query has been received and a set of search results 108 determined and returned for presentation in response to the request. In this example the user has submitted a query including the keyword "dresses" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

It might be the case, however, that there were too many results returned and the user is not finding items of interest in an initial subset of the results. Accordingly, the user might want to narrow the query in order to obtain search results that are more relevant or of interest to the user based on the user's current interest. For example, FIG. 1B illustrates example 150 of an updated set of search results 154 returned for a new query 152 that specifies "black dresses." Similarly, if the user would like a different type of dress the user might want to modify the query in some way. For example, if the user had originally submitted a query such as "cocktail dresses" but is instead interested in results that are less formal, the user would need to submit a query that describes a different type of dress, such as summer dresses. However, even with a search interface in place, it can be difficult for customers to find relevant items. For example, the user may be looking for items to wear to a particular occasion or items that are within their particular comfort range. Unless the user knows an exact brand or style of an item that the user wants, or the appropriate search terms, the user might have to search through hundreds or thousands of different items using various options to attempt to locate the type of item in which the user is interested. If the user is interested in an item of a specific type, the user might have no option but to sift through these results, potentially only being able to narrow the results by price, ratings, availability, or other such options.

There are various downsides to such approaches, however. For example, dresses may be available that are red or have a similar color to red as well as having a short length that may not appear in the updated results because the dresses are not categorized, classified, or otherwise identified as being visually similar to the image query. Further, short length is a subjective descriptor and dresses that are categorized as short by one person may not match the desires of the user. Additionally, there may be many visual attributes that a user might specify, such as length, shape, pocket style, sleeve style, and the like, and it will often be the case that content for dresses will not include information for all of these attributes, let alone all possible options for each attribute. Thus, a keyword-based approach will likely miss some of the relevant dresses that would otherwise correspond to the user's intent. Further, a user might have a very clear idea in her mind as to the type of result she wants to obtain, but may not know exactly how to describe the item through keywords in order to obtain the exact result. For example, the user might want to see dresses with a particular style but may not know the correct term to describe that style. For instance, it can be difficult to describe a shoe with a particular shape or a shirt top with a particular pattern. Similarly, if the user wants an item with sleeves of a certain length, there may be no consistent way of describing that particular length. As such, attribute filters or text-based searching using keywords or natural language queries can be difficult methods for a user to find a particular product, even when combined with visual image searching functionality.

Further, there can be some items that are not easily classifiable with a single classification. For example, an image of a dress might be presented where the dress represented in the image has a visual attributes that exhibit aspects of various types of different attributes. For example, a neckline style may have different aspects of different types of neckline styles such that it is a hybrid neckline that shares aspects of different types of necklines. It has been demonstrated that certain fashion details, such as neckline, collar, sleeve, shape, length, pocket etc., can have a significant influence on online shoppers' choices when those shoppers are searching for items with aesthetic or visual components, such as clothing items. The inherent limitation of text-based search makes it difficult to return an accurate result, especially when an item for which a customer is searching does not fit a strict or typical instance of a particular category or type of item. Further, conventional image-based recommendation systems are not particularly suitable for this task because those systems work in a holistic style. Accordingly, approaches in accordance with various embodiments can allow users to search for similar items in an electronic catalog based on certain desirable visual attributes.

Figure 2A:
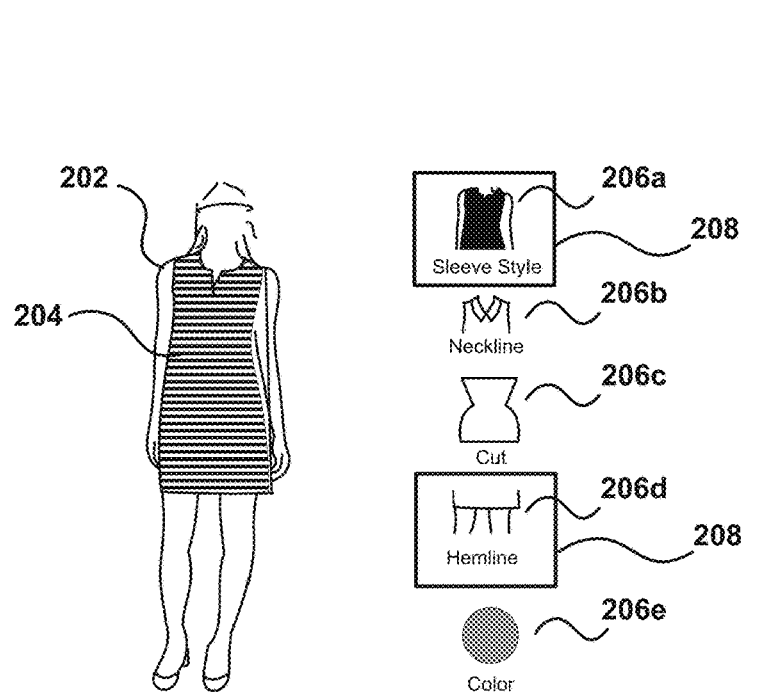
FIG. 2A illustrates an example representation of parts-based visual similarity search, in accordance with various embodiments of the present disclosure.

FIG. 2A illustrates example representations 200 of parts-based visual similarity search, in accordance with various embodiments. A query image 202 of an item 204, such as a dress, may be displayed to a user along with a plurality of visual attributes 206a-e associated with the item 204. In this example, the dress has a sleeve style attribute 206a, a neckline attribute 206b, a cut attribute 206c, hemline attribute 206d, and a color attribute 206e. In other embodiments, the item 204 may have more, fewer, and/or different visual attributes. In some embodiments, the visual attributes may be associated with various parts of the item. As illustrated in this example, the sleeve style attribute 206a may be associated with a portion of the image that represents a sleeve part of the item 204 and the hemline attribute 206c may be associated with a portion of the image that represents a hemline part of the item 204. A user can select which attributes they like about the item. In this example, the sleeve length attribute 206a and the hemline attributes 206c are selected as desirable attributes 208, meaning that the user would like to see search results of dresses having similar sleeve style and similar hemline as the item 204 in the query image. FIG. 2A illustrates an example embodiment in which the desirable attributes 208 are from the same item.

Figure 2B:
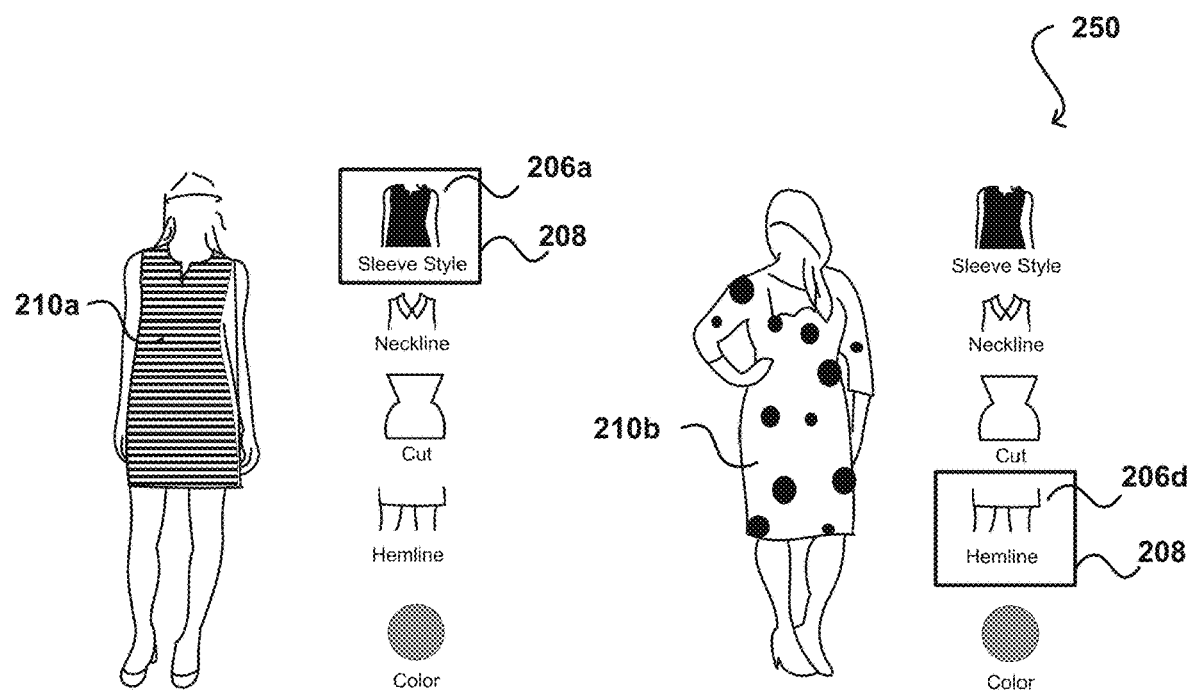
FIG. 2B illustrates an example representation of another parts-based visual similarity search, in accordance with various embodiments of the present disclosure.

In various embodiments, the desirable attributes 208 may be from different items, as illustrated in the example representation 250 of FIG. 2B. In the example of FIG. 2B, the desirable attributes 208 are selected from two different items 210a, 210b. Specifically, in this example, the user may favor the sleeve style attribute 206a of a first item 210a as a desirable attribute 208 and the hemline 206c of a second item 210b as another desirable attribute 208, meaning the user would like to see search results that ideally include dresses having similar sleeve style as the first item and similar hemline as the second item 210b. In various embodiments, attributes from more than two item can be used. In some embodiments, the same attribute from two or more items may also be selected, in which case the results may include items that match the attribute of at least one or the items. For example, if the color attribute of a black dress is selected and the color attribute of a red dress is also selected, then the results may include black dress and red dresses. In other embodiments, the results of such a query may return dresses that include both black and red coloring.

In various embodiments, the query images 202 may be images of items offered for consumption in an electronic marketplace. For example, as a user browses the electronic marketplace and engages with products shown automatically or as search results, the user may be able to select various visual attributes of certain items to further refine search results according to the selected attributes, such as shown in FIGS. 2A and 2B. The search results may include other items in the electronic marketplace. In various embodiments, the query images 202 may be provided by the user, such as an image uploaded by the user that is not originally a part of the electronic marketplace data. For example, the image may be captured via a camera on the user device and uploaded. In another example, the image may be a screenshot captured by the user while browsing the Web. Thus, query images 202 may be images that have already been processed at the time of the query such that the portions of the image and feature vectors corresponding to various visual attributes are already identified and extracted. Query image may also be images that are uploaded and processed on the fly at the time of the query in order to identify and extract data from the parts of the image corresponding to the various visual attributes.

An image query can be analyzed to identify multiple visual attributes of an item and the multiple visual attributes can be used to find the most relevant and most visually similar search results to the query image while allowing changes to particular attributes of the query image. The applicable attributes can vary by factors such as the type or category of item and may be determined using a trained neural network to identify the relevant attributes to a particular item or image of an item. In some embodiments, the items in a category can be logically arranged in an n-dimensional multiple attribute space, or representation space, such that the various attributes can be used to refine or locate new search results based on the visual attributes selected by a user.

Such approaches can enable a system or service to recommend apparel products that are visually similar to query images with respect to specific visual attributes, such as fashion styles and details for example. Such a system can improve an online shopping experience, for example, in that it provides results that are consistent with customers' visual perceptions and desires. Approaches presented herein can work on catalog or other stored images, as well as mobile queries or social media images of apparel items, etc. Such approaches can also support multiple possible forms of outputs, which can simplify integration with other visual or non-visual attributes in a general-purpose apparel shopping engine or other such applications.

Figure 3:
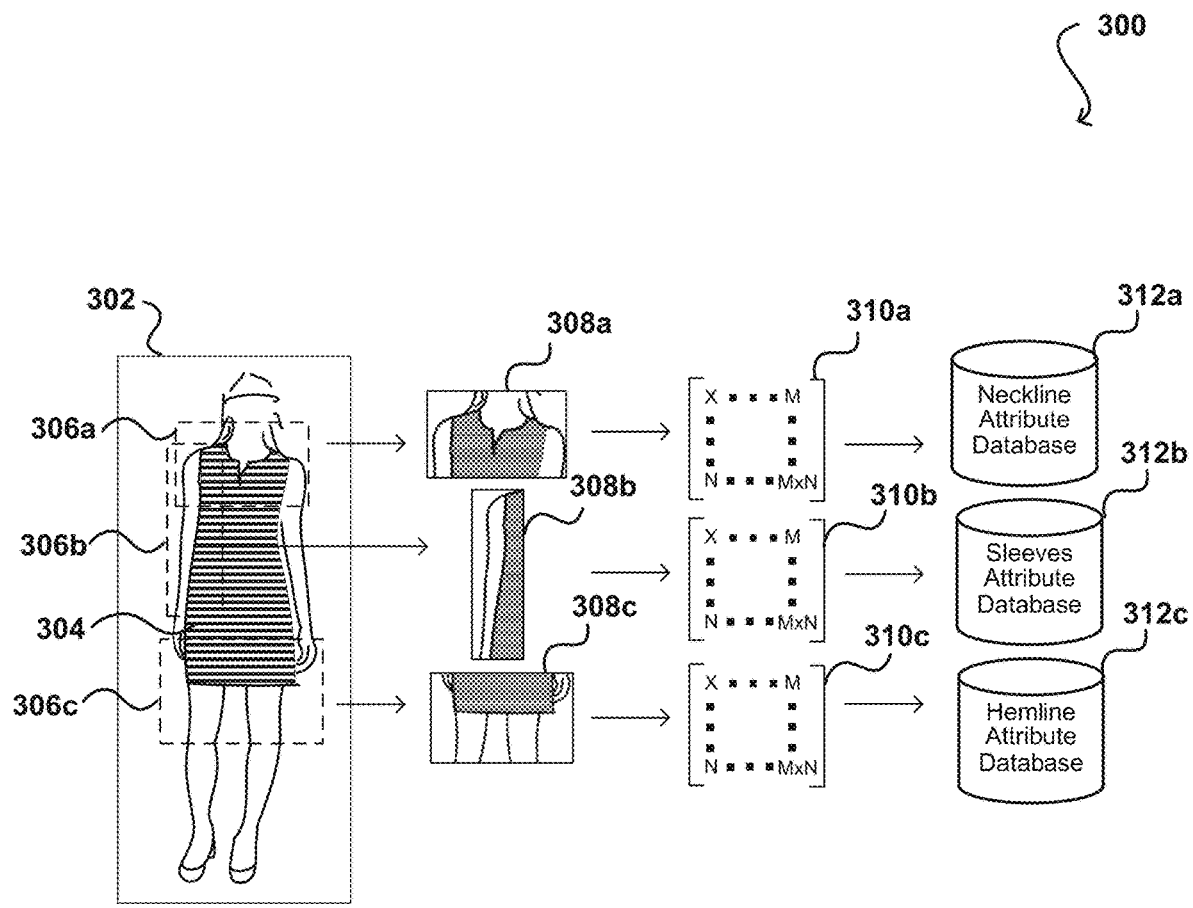
FIG. 3 illustrates an example technique for training a database for parts-based visual similarity search, in accordance with various embodiments of the present disclosure.

FIG. 3 illustrates an example technique 300 for training a database for parts-based visual similarity search, in accordance with various embodiments. In various embodiments, In order to create an electronic catalog of items that is searchable by parts-based visual attributes, the visual attributes are identified and extracted from the image data 302 of each item, such as item 304 for example. Specifically, in some embodiments, the image data for each item can be analyzed using a localization process or other such process to identify the portions 306a-c of the image that correspond to the respective visual attributes. For example, the image data of an apparel item may be an image of a person wearing the apparel item, and a trained object detection algorithm or a spatial relation approach can be utilized in through which body parts or other features are identified in the image that can then be used to determine the a patch region of the image where a certain attribute is likely represented. Position information (e.g., coordinates) of bounding boxes that include areas on interest for use in training can be obtained. As described, an area of interest can include a region of person's body such as a person's neckline, arm area, leg area, waist area, back area, entire body, or some other area. In some embodiments the bounding box can be used to crop out the areas of interest while in other embodiments the coordinates are used to determine the appropriate area. For example, such a localization technique may be used to identify the location of a nose and shoulders in the image, and thus be able to approximate a patch 308a of the image corresponding to the neckline attribute of the item.

In example embodiments, a skeletal localization approach may be utilized to obtain keypoints for the specific joints of the human body. Given the keypoints for the specific joints of the human body in the image, the portions of the image relevant for specific attributes can be determined based on the positions of the keypoints. For example, given positions for a knee, hip, and ankle, a portion of the image relevant to the hemline attribute may be determined. Other objects or body parts may be appropriate for other types of visual attributes, etc. In some embodiments, a bounding box parameterized by four corner points can define the portion 306a of the image associated with a certain attribute. For example, for the neckline attribute, the bounding box may include a tight crop of the person's neck region as defined relative to a nose and shoulder. In some embodiments, an attribute such as color or pattern may be determined based on a center part of the item, which may be defined by a patch in the center of the person's body as defined relative to the neck and hip keypoints. Another example attribute may be a holistic view of the item, with a bounding box cropped tight from the neck and below, as defined relative to the neck and ankle keypoints. In some embodiment, localization techniques can involve using a trained object detection algorithm or using a spatial relation approach wherein a body part or other feature is identified in the image that can then be used to determine the patch region where the attribute is likely represented. Other localization processes can be utilized as well as discussed elsewhere herein. A neural network may also be trained to identify portions of an image that correspond to various attributes, such as using labeled training data.

In some embodiments, utilizing the skeletal localization approach, and given the configuration keypoints of the joints, it can be determined whether a certain attribute may or may not be accurately extracted and analyzed. For example, based on the positioning of the keypoints of the knees and angles, it may be determined that the particular pose of the person is not conducive to determining the hemline, such as in the case of a sitting down pose. I such scenarios, one or more attributes may not be available for certain items in an effort to maintain a high confidence results. The patches 308a-c of the image identified as correspond to the respective visual attributes can then be processed using various feature extraction techniques to determine the feature vectors 310a-c, or other form of feature value or feature data, of the respective visual attributes. In example embodiments, a color histogram extractor and a deep feature extractor may be used. In some embodiments, a deep context model may be utilized for the deep feature extractor, which includes an unsupervised model trained on patches to predict context.

In accordance with various embodiments, there are a number of ways to determine the feature vectors. In one such approach, embodiments of the present invention can use the penultimate layer of a convolutional neural network (CNN) as the feature vector. For example, classifiers may be trained to identify feature descriptors (also referred herein as visual attributes) corresponding to visual aspects of a respective image of the plurality of images. The feature descriptors can be combined into a feature vector of feature descriptors. Visual aspects of an item represented in an image can include, for example, a shape of the item, color(s) of the item, patterns on the item, as well as different portions of the items as described above, etc. Visual attributes are features that make up the visual aspects of the item. The classifier can be trained using the CNN.

In accordance with various embodiments, CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set (which includes jewelry, dresses, clothing, cars, books, food, people, media content, etc.), so it learns the best feature representation of a desired object represented for this type of image. The trained CNN is used as a feature extractor: input image is passed through the network and intermediate outputs of layers can be used as feature descriptors of the input image. Similarity scores can be calculated based on the distance between the one or more feature descriptors and the one or more candidate content feature descriptors and used for building a relation graph.

The feature vectors and an item identifier may be stored in respective attribute databases 312a-c. In some embodiments, the feature vectors 310a-c of all the visual attributes may be stored in one database and associated with the item identifier. Thus, feature values of parts-based visual attributes of items in the electronic catalog can be determined and used to select or rank the items in response to a search query based on desirable visual attributes. In various embodiments, the process described above and illustrated in FIG. 3 may be applied to all items in a database of items such that the feature vectors corresponding to all the defined visual attributes for the items are stored in one or more databases and ready to be used to produce results in response to attribute based search queries. In some embodiments, such a process may be performed on the fly in response to a search query.

Figure 4:
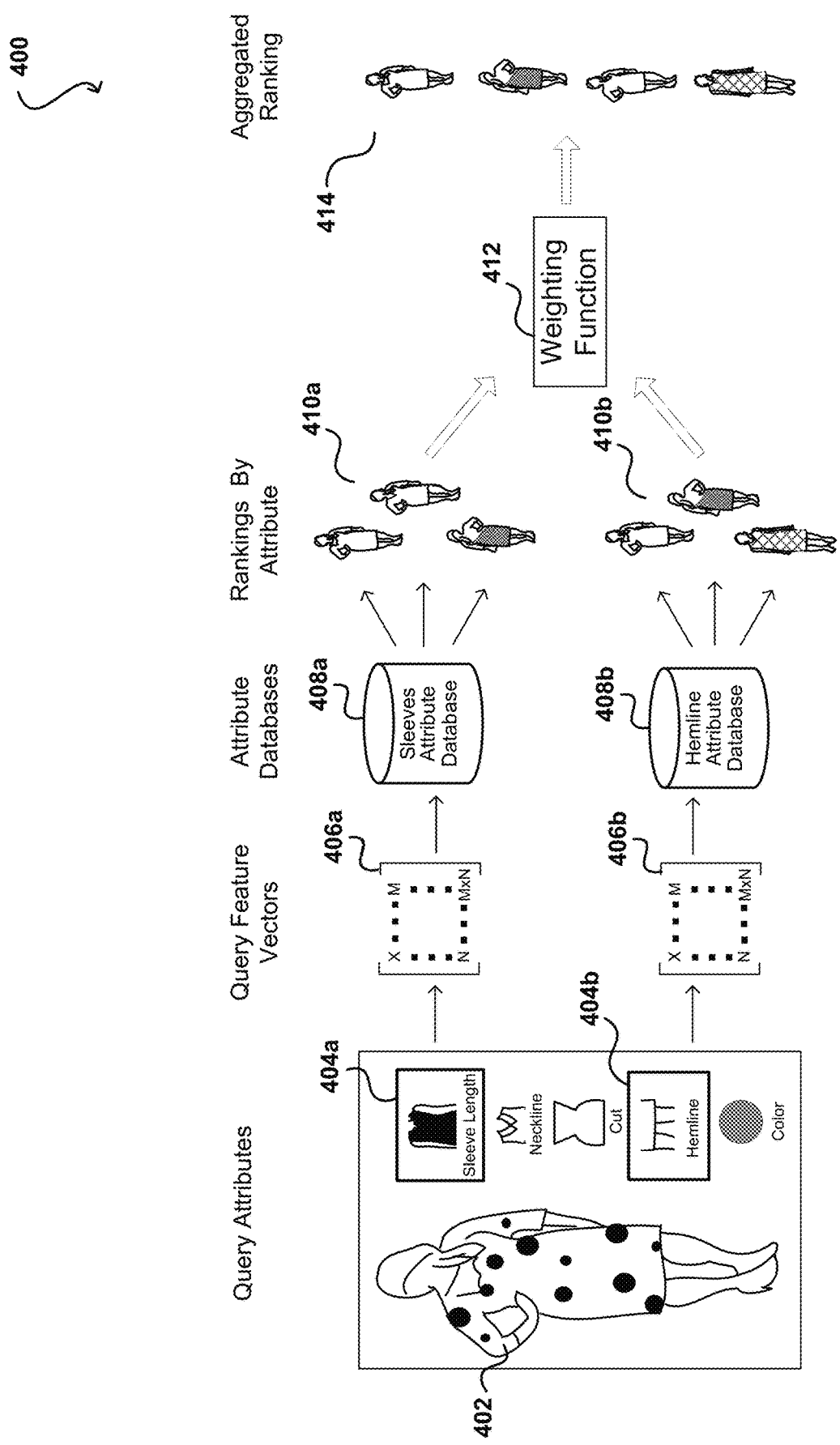
FIG. 4 illustrates an example technique for parts-based visual similarity search, in accordance with various embodiments of the present disclosure.

FIG. 4 illustrates an example technique 400 for parts-based visual similarity search, in accordance with various embodiments. To conduct a search using parts-based visual attributes, a user may define desirable visual attributes 404a, 404b of one or more items 402. Thus, the search may be characterized as a query including one or more desirable visual attributes associated one or more items. In some embodiments, the desirable attributes may be defined by one or more parts of the one or more items. For example, a user may select the neckline of a first dress and the color of a second dress as the desirable visual attributes. In another example, the user may select the neckline of a first dress and the color of the first dress as the desirable visual attributes. Feature values 406a, 406b (e.g., feature vectors) of the desirable visual attributes 404a, 404b can be determined and used to query a database (e.g., electronic catalog) of items.

In some embodiments, the feature vectors of a certain visual attribute of an item is already available in a database because the image data for the item was previously processed to extract the feature vectors of its visual attributes. In this case, the query feature vectors can be obtained directly from the at the time of the query without any image processing needed. This may be the case when the items in the query are a part of an electronic catalog of items that has been processed according to the training process illustrated in FIG. 3. In other embodiments, the item may not exist in the database or image data associated with the item has not been processed, and the feature vectors of its visual attributes has not been extracted. In this case, image data representing the item may be obtained and feature extraction may be performed from the image data, such as using the technique illustrated in FIG. 3, at the time of the query. For example, the user may see a dress they like at a store or in a magazine and wants to search for similar dresses. The user may take a picture of the dress and provide the image data as a part of the query. In this scenario, the image data is processed on the fly, such as using the technique illustrated in FIG. 3, to identify and extract query feature vectors for its visual attributes, such as sleeve style, neckline, cut, hemline, color, etc.

In various embodiments, once the query feature vectors 406a, 406b are determined, either through performing feature extraction or obtaining stored feature vectors, databases 408a, 408b for each of the desirable attributes is queried to identify items having a feature vector similar to the query feature vector with respect to a certain attribute. For example, a sleeve style database 408a of feature vectors may be queried to compare the sleeve style feature vector of the query to sleeve style feature vectors of a plurality of items. In some embodiments, the feature vectors in an attribute database for a certain attribute are compared to the corresponding query feature vector for that attribute using a K-nearest neighbors (KNN) approach, which ranks the feature vectors in the attribute database based on similarity to the query feature vector. In some embodiments, the feature vectors may be ranked based on the "distance" between the query feature vector and each of the feature vectors in the database, in which the shortest distance indicates the highest degree of similarity. Thus, a similarity score with respect to the specific attribute for an item in the attribute database can be determined.

In some embodiments, the similarity score is the rank position, the distance, or another measure derived from the rank or distance. A similarity score can be determined using the above-described technique for each item with respect to each of the selected attributes. In some embodiments, the items can be ranked for each selected attribute based on the respective similarity scores for the individual attributes. For example, a ranking 410a of the items can be determined based on sleeve style similarity to the queried item and another ranking 410b of the items can be determined based on hemline similarity to the queried item, in which the ranking of items for the two attributes may be different. In certain embodiments, there may be a similarity score threshold that items must meet for a certain attribute in order to be considered or receive a ranking.

In various embodiments, in order determine an overall ranking of the items in response to the query, a weighting function 412 may be applied to the similarity scores of an individual item to obtain an overall similarity score. The weighting function may define relative weights of the similarity scores of each attribute and how much they contribute to the overall similarity score. For example, the overall similarity score for an item in the illustrated example of FIG. 4 may be defined as: Overall Similarity Score=Sleeve Similarity Score (0.4)+Hemline Similarity Score (0.6), with 0.4 and 0.6 being respective weights for the sleeve attribute and the hemline attribute. In some embodiments, the weights of the attributes may be based at least in part on a user input. For example, the the user can define the weight by defining a prioritization ranking of the attributes, or otherwise defining the importance of the attributes. A user interface can be correspondingly be presented to elicit such a user input, such as a drop-down selectors, radio buttons, sliders, and this like.

After the overall similarity scores are determined for the items, an overall ranking 414 of the items can be determined, which can be used to determine the items returned at search results. In some embodiments, a predetermined number of highest ranking items are presented as search results. In some embodiments, the search results include only items that meet a certain overall similarity score threshold.

Figure 5:
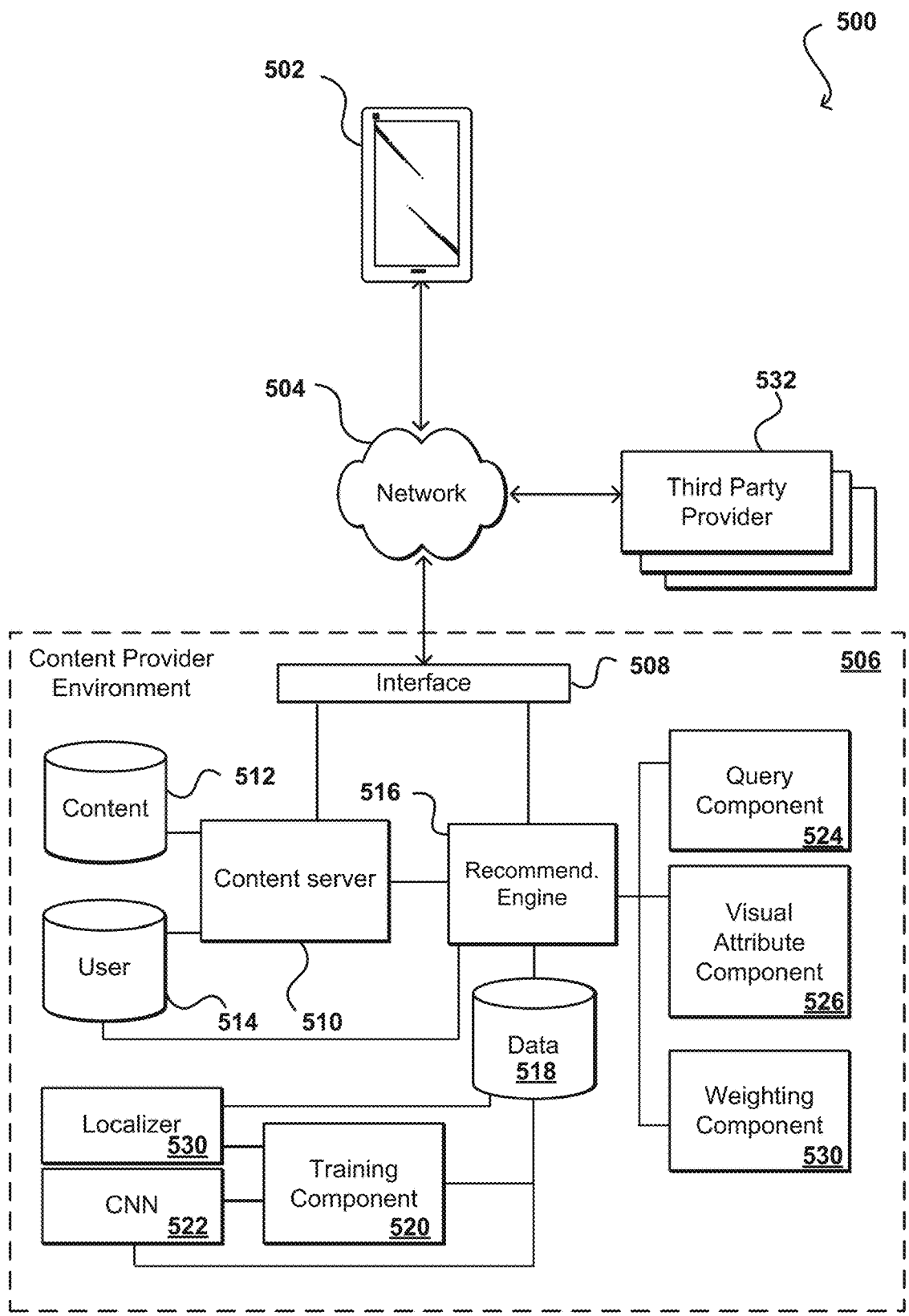
FIG. 5 illustrates an example environment in which aspects of the various embodiments can be implemented, in accordance with various embodiments of the present disclosure.

FIG. 5 illustrates an example environment 500 in which aspects of the various embodiments can be implemented. FIG. 5 illustrates an example environment 500 in which aspects of the various embodiments can be implemented. In this example, a computing device 502 is able to make a call or request across one or more networks 504 to a content provider environment 506. The network(s) can include any appropriate network, such as the Internet, a local area network (LAN), a cellular network, an Ethernet, or other such wired and/or wireless network. The content provider environment 506 can include any appropriate resources for providing content from a resource provider, as may include various servers, data stores, and other such components known or used for providing content from across a network (or from the "cloud").

In this example, a request received to the content provider environment 506 can be received by an interface layer 508 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 510 and/or content servers, which can obtain the content from a content data store 514 or other such repository to be sent back across the network(s) to the computing device. In some embodiments, information for the request might also be compared against user data in a user data store 512 or other such location do determine, for example, whether the user has access rights to that content.

In some embodiments user data might also be analyzed to determine which type of content to provide, additional supplemental content to provide with the primary content, and the like.

In some instances a user might want to refine the results by based on one or more visual attributes associated with one or more items represented in one or more images. In at least some embodiments each category or type of item may have corresponding types of visual attributes that can be used to refine the results. In some embodiments an indication of these attributes can be returned with the initial results, as may be determined by the content server 510 or the recommendation engine based upon data stored in the data repository 518 or determined using a query component 524, visual attribute component 526, among other such options. When a subsequent request including a search query is received including visual attributes of one or more items, the recommendation engine can work with the query component 524 and the visual attribute component 526 to determine, among other things, the feature vector for the visual attributes of the query items and the corresponding search results. As mentioned, in some embodiments the request might specify rankings, magnitudes, or relative weights for the various attributes, which can be set in some embodiments using a weighting component or other such mechanism. The information can be fed back to the recommendation engine 516 which in this example includes the refinement logic to perform the lookup against the data in the data store 518 in order to determine the refined results.

The feature vector can be determined at least in part using neural networks 522 such as a convolutional neural network (CNN) or other feature extraction method. In some embodiments, the appropriate vectors may be determined through training on an appropriate data set. The training component 520 can perform the training on the models and provide the resulting results and/or trained models for use in determining the multiple attribute feature vectors for an image query. In order to determine attributes for various content items, in at least some embodiments, some analysis of content items in an electronic catalog or other data repository is performed to determine information about the visual characteristics of the items. In some embodiments, one or more feature descriptors or vectors can be generated to describe various attributes of an image associated with a set of visual attributes associated with the image. The training component 520 can be the same system or service that is used to train the localizer 530, as well as various face detectors or other models, networks, or algorithms discussed or suggested herein.

In some example embodiments, such as shown in FIG. 5, a neural network 522 such as a convolutional neural network (CNN) can be trained using, for example, images of objects. As mentioned, for CNN-based approaches there can be pairs of images submitted that are classified by a type of attribute, while for GAN-based approaches a series of images may be submitted for training that may include metadata or other information useful in classifying one or more aspects of each image. For example, a CNN may be trained to perform object recognition using images of different types of objects, then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 518 that includes images of a number of different objects.

A training component 520 can utilize the training data set to train the neural network 522. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

In some embodiments, the initial query and information associated with the query may be received from client device 502 over network 504 and processed by query component 524. In some embodiments, the query may be associated with one or more query images when a selection of an image from a third party provider 532 or content provider environment 506 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the neural network 522 to extract a feature vector from the network before the classification layer. This feature vector describes the subject and/or objects shown in the image. Using the local feature descriptors and object feature descriptors, visually similar images in content provider environment 506 can be identified.

Figure 6:
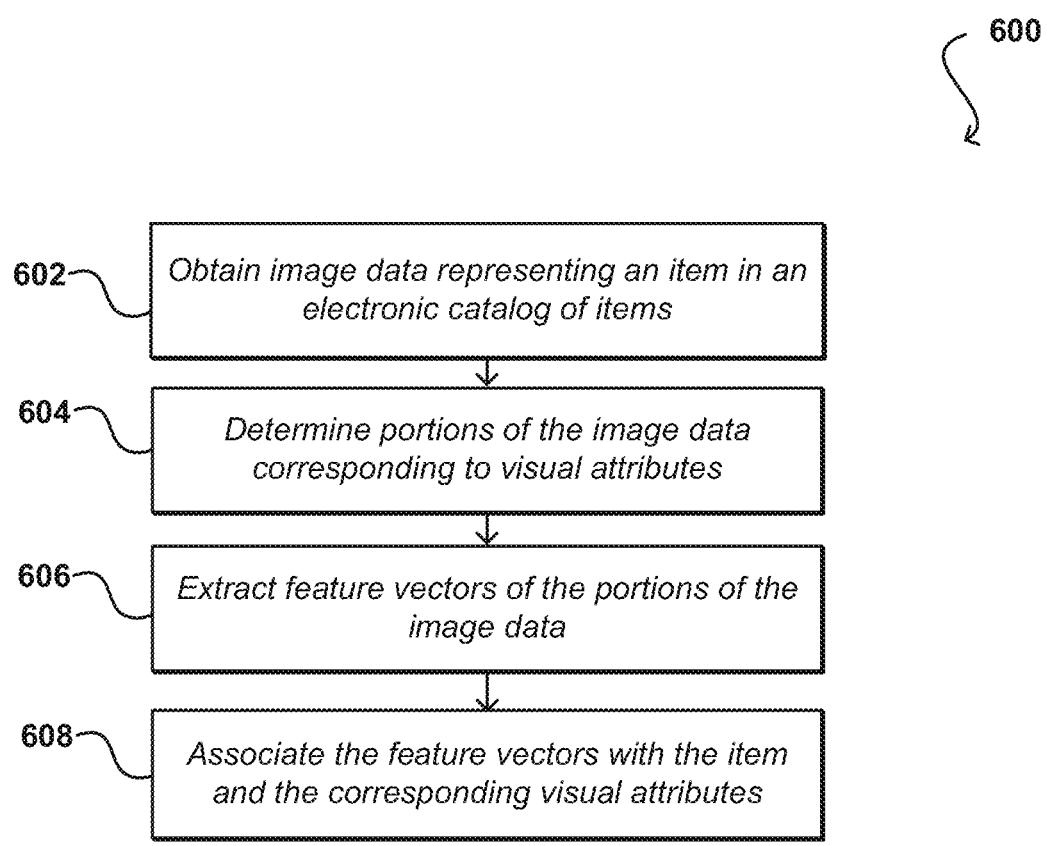
FIG. 6 illustrates an example process for training a database for parts-based visual similarity search, in accordance with various embodiments of the present disclosure.

FIG. 6 illustrates an example process 600 for training a database for parts-based visual similarity search, in accordance with various embodiments. It should be understood that, for any process discussed herein, there can be additional, fewer, or alternative steps performed in similar or alternative orders, or in parallel, within the scope of the various embodiments. In this example, an item entry in an electronic catalog can be individually processed to make the item entry searchable in response to parts-based visual search. In order to do so, image data representing the item may be obtained 602. Portions of the image data that correspond to one or more visual attributes can be determined 604. In some embodiments, a visual attribute, such as a neckline, may be associated with a certain part of the item, and the portion of the image data that corresponds to said part may be a portion of the image that includes a representation of said part of the item. For example, the portion of the image corresponding to the neckline attribute may be a portion of the image that includes a representation of a neckline of the item. Feature vectors can be extracted 606 from the respective portions of the image data. Thus, the feature vectors correspond, respectively, to the visual attributes. For example, a feature vector may correspond to the neckline attribute and another feature vector may correspond to the hemline attribute.

Various feature extraction techniques may be utilized and different feature extraction techniques may be used based on the attribute. The extracted feature vectors are then associated 608 with the item and the corresponding attributes. In some embodiments, the extracted features may be stored in a database with an item identifier so that the item can be searchable any of its feature vectors. In some embodiments, such a process can be repeated or performed in tandem for all items in an electronic catalog.

Specifically, in some embodiments, the image data for the item can be analyzed using a localization process or other such process to identify the portions of the image that correspond to the respective visual attributes. For example, the image data of an apparel item may be an image of a person wearing the apparel item, and a trained object detection algorithm or a spatial relation approach can be utilized in through which body parts or other features are identified in the image that can then be used to determine the a patch region of the image where a certain attribute is likely represented. Position information (e.g., coordinates) of bounding boxes that include areas on interest for use in training can be obtained. In some embodiments, utilizing a skeletal localization approach, which can determine the position of keypoints representing various joints (or other parts) of a human body, it can be determined whether a certain attribute may or may not be accurately extracted and analyzed. For example, based on the positioning of the keypoints of the knees and angles, it may be determined that the particular pose of the person is not conducive to determining the hemline, such as in the case of a sitting down pose. I such scenarios, one or more attributes may not be available for certain items in an effort to maintain a high confidence results.

Figure 7:
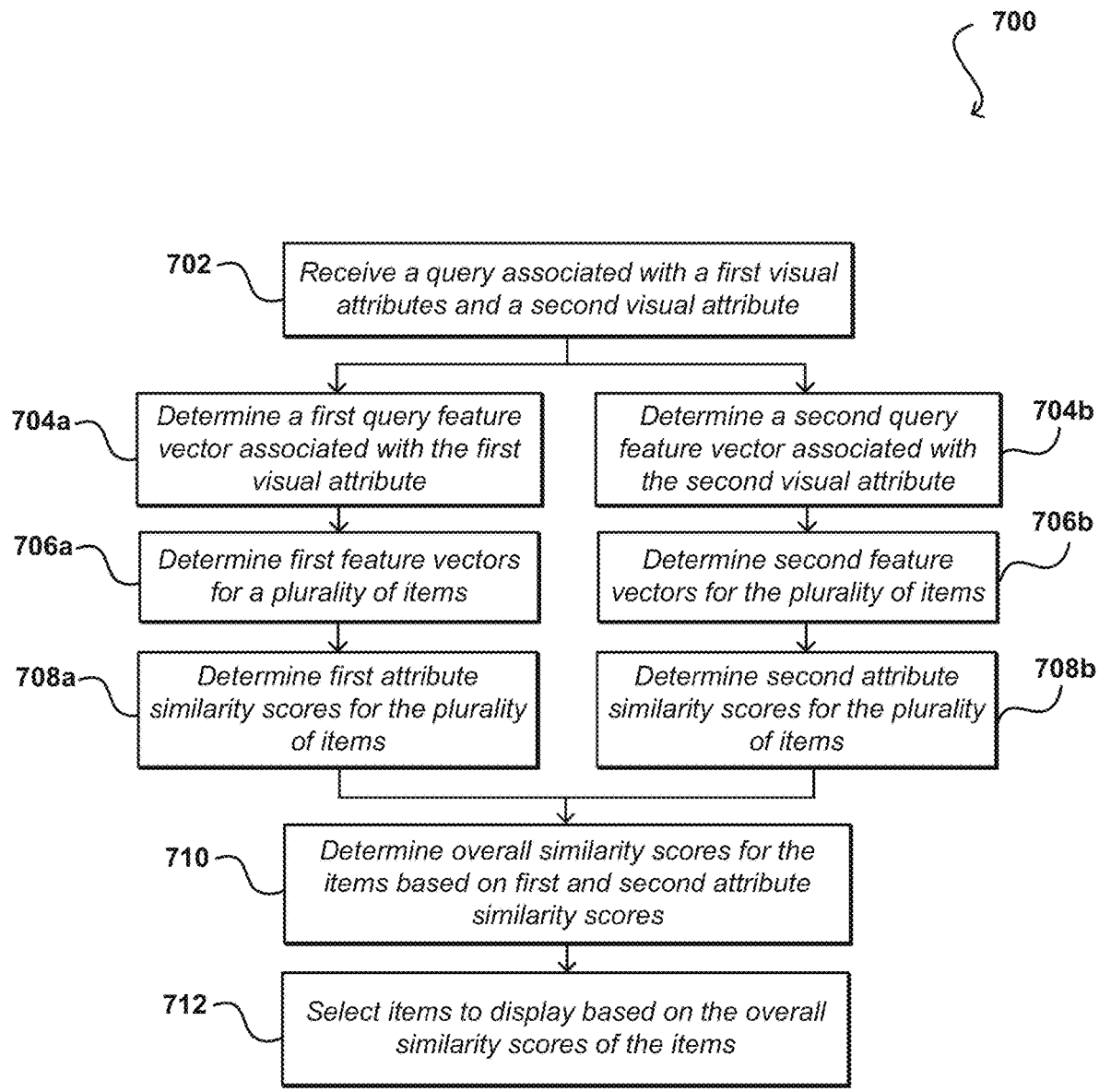
FIG. 7 illustrates an example process for parts-based visual similarity search, in accordance with various embodiments of the present disclosure.

FIG. 7 illustrates an example process 700 for parts-based visual similarity search, in accordance with various embodiments. In this example, a query is received 702, in which the query is associated with a first visual attribute and a second visual attribute. For example, a user may have selected a sleeve style attribute and a hemline attribute of an item. A first query feature vector associated with the first visual attribute is determined 704. In some embodiments, the first query feature vector may be determined by querying a database or determined through image processing feature extraction. First feature vectors may be determined 706a for a plurality of items, such as items in an electronic catalog. The first feature vector of an individual item refers to a feature vector of the first attribute of the individual item. For example, if the first attribute is sleeve style, the first feature vector of an item may be a feature vector describing the sleeve style of the item. Using the first feature vectors of the items and the first query feature vector, first attribute similarity scores of the item can be determined 708a.

Similarly, a second query feature vector associated with the second visual attribute may be determined 704b. Second feature vectors corresponding to the second visual attribute are then determined 706b for the plurality of items. Thus, second attribute similarity scores can be determined 708b for the items by comparing the second feature vectors of the items to the second query feature vector. After the first attribute similarity scores and the second attribute similarity scores are determined for the items, overall similarity scores can be determined 710 for the items based on the first and second attribute similarity scores. In some embodiments, the first and second similarity scores of an individual item are aggregated to produce the overall similarity score for the item. In some embodiments, the aggregation may utilize a weighting function. The weighting function may define much the the first and second similarity scores contribute, respectively, to the overall similarity score. Items from the plurality of items can then be selected 712 to be displayed as search results based on the over similarity scores. In some embodiments, the items may be ranked based on their overall similarity scores.

Figure 8:
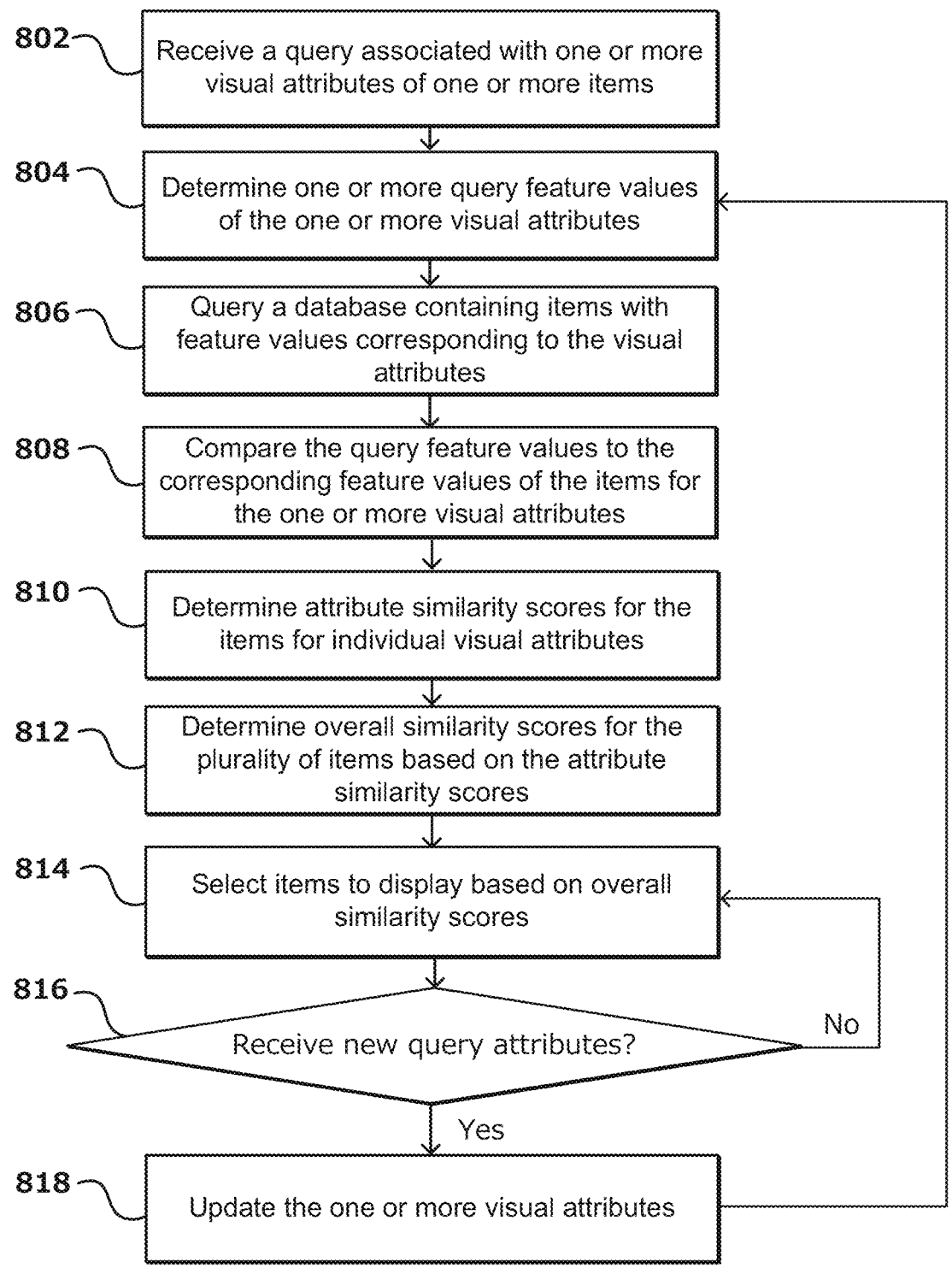
FIG. 8 illustrates an example process of updating search results based on parts-based search refinement, in accordance with various embodiments of the present disclosure.

FIG. 8 illustrates an example process 800 of updating search results based on parts-based search refinement, in accordance with various embodiments. In this example, a query is received 802, in which the query is associated with one or more visual attributes of one or more items. The one or more visual attributes may be those selected by a user. One or more query feature values (e.g., feature vector) corresponding to the one or more visual attributes of the one or more items may then be determined 804. A database may contain items with feature values corresponding to the one or more visual attributes. Thus, the database is queried 806 to find items with similar attribute feature values as the corresponding query feature values of the one or more items from the query. Specifically, the query feature values are compared 808 to the corresponding feature values of the items for the one or more visual attributes.

Based on the comparison, attribute similarity scores for the items can be determined 810 for individual visual attributes of the one or more visual attributes selected by the user. For example, an individual item may receive a first attribute similarity score for a first attribute (e.g., neckline) and a second attribute similarity score for a second attribute (e.g., color), indicating how similar the item is to the queried items with respect to each of the one or more visual attributes selected by the user. After the first attribute similarity scores and the second attribute similarity scores are determined for the items, overall similarity scores can be determined 812 for the items based on the first and second attribute similarity scores. In some embodiments, the first and second similarity scores of an individual item are aggregated to produce the overall similarity score for the item.

In some embodiments, the aggregation may utilize a weighting function. The weighting function may define much the the first and second similarity scores contribute, respectively, to the overall similarity score. Items from the plurality of items can then be selected 814 to be displayed as search results based on the over similarity scores. In some embodiments, the items may be ranked based on their overall similarity scores. It can also be determined 816 if a new query attribute is received. For example, a new query attribute may be received if the user changes one of the selected attributes or selects an additional attribute of an item. If no new query attributes are received, then the same items and/or item ranking is maintained as the search results. If a new query attribute is received, then the one or more attributes are updated 818 and the process may reiterate based on the updated set of visual attributes.

Figure 9:
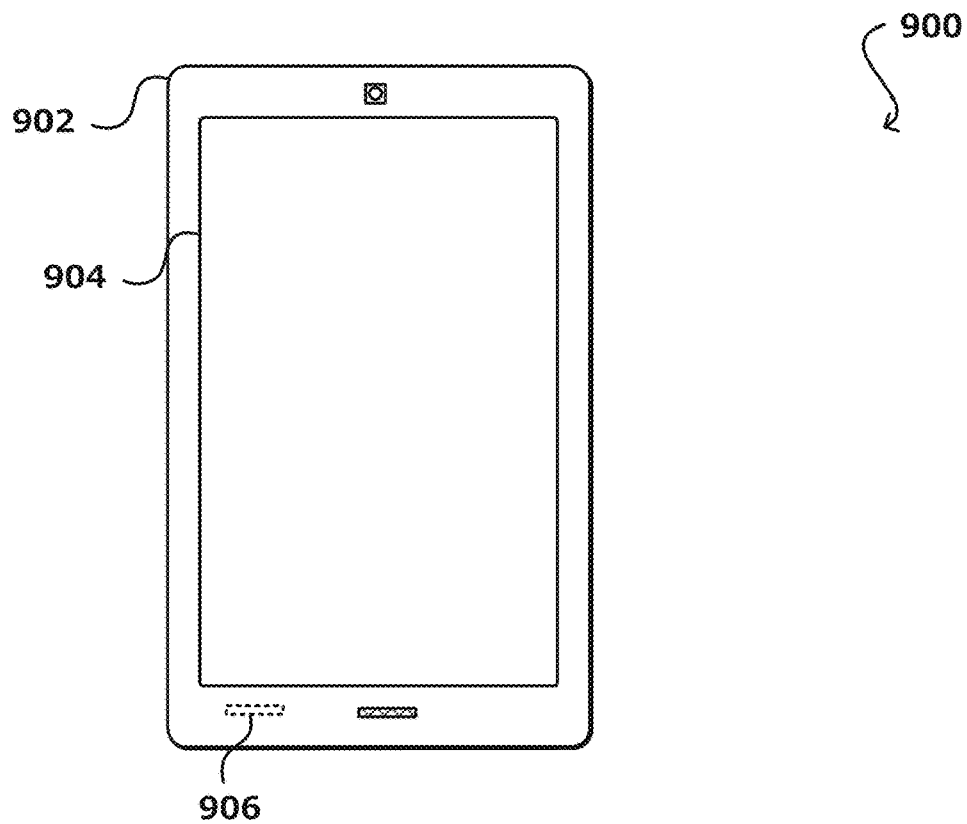
FIG. 9 illustrates an example computing device that can be used, in accordance with various embodiments of the present disclosure.

FIG. 9 illustrates an example computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 900 has a display screen 904 and an outer casing 902. The display screen under normal operation will display information to a user (or viewer) facing the display screen (e.g., on the same side of the computing device as the display screen). As discussed herein, the device can include one or more communication components 906, such as may include a cellular communications subsystem, Wi-Fi communications subsystem, BLUETOOTH® communication subsystem, and the like.

Figure 10:
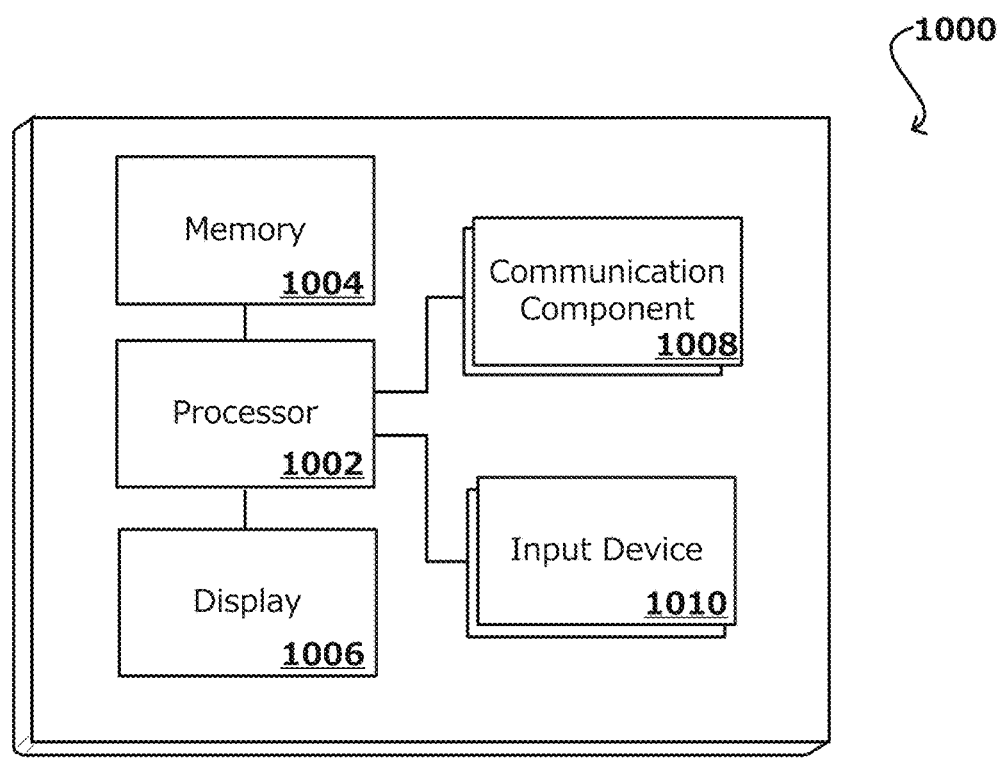
FIG. 10 illustrates a set of basic components of one or more devices of the present disclosure, in accordance with various embodiments of the present disclosure.

FIG. 10 illustrates a set of basic components of one or more devices 1000 of the present disclosure. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device typically will include at least one type of display element 1006, such as a touch screen, electronic ink (e-ink), organic light emitting diode (OLED) or liquid crystal display (LCD), although devices such as portable media players might convey information via other means, such as through audio speakers. The device can include at least one communication component 1008, as may enabled wired and/or wireless communication of voice and/or data signals, for example, over a network such as the Internet, a cellular network, a Wi-Fi network, BLUETOOTH®, and the like. The device can include at least one additional input device 1010 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 11:
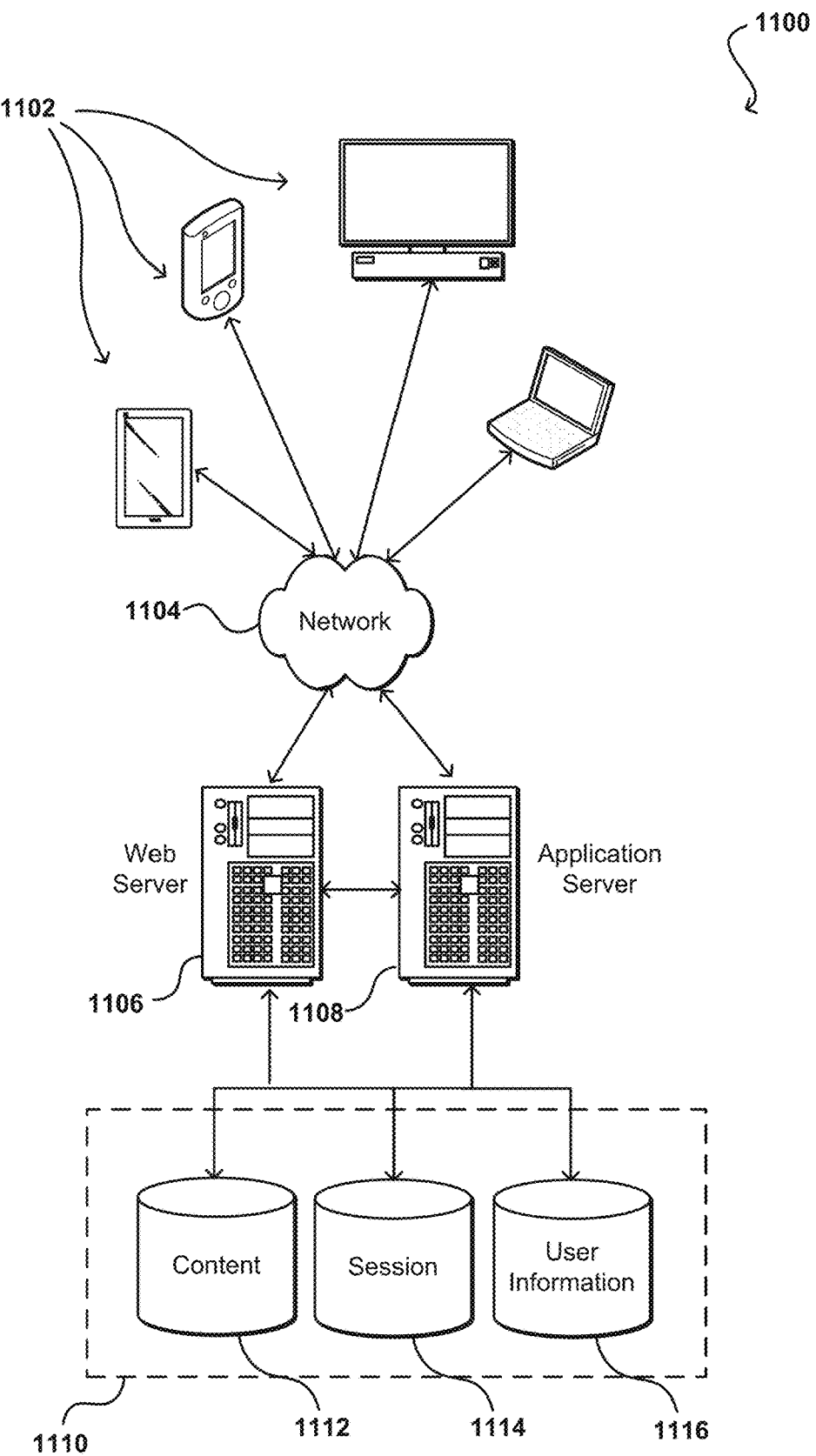
FIG. 11 illustrates an example environment for implementing aspects, in accordance with various embodiments of the present disclosure.

FIG. 11 illustrates an example environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   receive a query including a plurality of visual attributes associated with a plurality of parts of one or more items;
   determine a plurality of query feature vectors respectively associated with the plurality of visual attributes;
   for individual visual attributes of the plurality of visual attributes:
   query a respective attribute database, of a plurality of attribute databases, corresponding to an individual visual attribute of the plurality of visual attributes, the attribute database including feature vectors corresponding to the individual visual attribute of a plurality of items; and
   determine respective attribute similarity scores for the plurality of items based on individual comparisons between the query feature vector corresponding to the specific visual attribute and the feature vectors in the attribute database; and
   for specific items in the plurality of items:
   determine an overall similarity score for a specific item based on the plurality of attribute similarity scores corresponding to the plurality of visual attributes; and
   determine one or more items of the plurality of items to display in response to the query based on the overall similarity scores of the one or more items.

2. The system of claim 1,
   wherein the instructions when executed further cause the system to:
   receive image data including a representation of a model wearing an apparel item, the apparel item having at least some of the plurality of visual attributes, the plurality of visual attributes including at least one of a neckline, a sleeve style, a hemline, a color, a pattern, a cut, a style, or an occasion;
   determine points in the image data corresponding to body parts of the model;
   determine portions of the image data corresponding to the plurality of visual attributes based on the position of the points; and
   extract the plurality of query feature vectors from the respective portions of the image data.

3. The system of claim 1, wherein the attribute similarity scores represent K-nearest neighbor distances or rankings positions determined based on the K-nearest neighbor distances.

4. The system of claim 1, wherein the instructions when executed further cause the system to:
   receive a user input defining weights of the plurality of visual attributes for the weighting function.

5. A computer-implemented method, comprising:
   receiving a query associated with a plurality of visual attributes;
   determining respective query feature values corresponding to the plurality of visual attributes;
   querying a plurality of databases corresponding respectively to the plurality of visual attributes using the respective query feature values, the plurality of databases each having a plurality of feature values corresponding to the respective visual attribute of a plurality of items;
   comparing the query feature values to the corresponding feature values of the plurality of items for the plurality of visual attributes;
   determining attribute similarity scores of the plurality of items for the plurality of visual attributes;
   determining overall similarity scores for the plurality of items, respectively, based on the respective attribute similarity scores of the plurality of items; and
   determining one or more results from the respective results to display in response to the query based on the overall similarity scores of the plurality of items.

6. The method of claim 5, further comprising:
   ranking the one or more items based at least in part on the overall similarity scores of the plurality of items.

7. The method of claim 5, further comprising:
   applying a weighting function to the attribute similarity scores of an item to determine the overall similarity score of the item.

8. The method of claim 7, further comprising:
   determining the weighting function based at least in part on a user input, the user input defining relative weights of the one or more attributes.

9. The method of claim 5, further comprising:
   wherein the plurality of visual attributes are respectively associated with a plurality of visual parts of the plurality of items.

10. The method of claim 9, further comprising:
    generating the database, wherein the plurality of items in the database are associated with respective image data;
    determining portions of the image data associated with the plurality of visual parts; and
    extracting the respective feature values of the plurality of visual attributes from the portions of the image data associated with the plurality of visual attributes.

11. The method of claim 10, further comprising:
    identifying points in the respective image data corresponding to parts of a human body, wherein individual portions of the image data associated with the plurality of visual parts are defined by one or more of the points.

12. The method of claim 11, further comprising:
    determining, based on the positions of one or more of the points, that one of the plurality of visual parts is indeterminate.

13. The method of claim 5, wherein the plurality of items include apparel items, and the plurality of visual attributes includes at least one of a neckline, a sleeve style, a hemline, a color, a pattern, a cut, a style, or an occasion.

14. The method of claim 5, further comprising:
    determining the plurality of query feature values from image data providing representations of one or more items.

15. The method of claim 14, wherein the image data is uploaded from a client device, captured using a camera of the client device, or pointed to via a link provided from the client device.

16. A system, comprising:
at least one computing device processor; and
a memory device including instructions that, when executed by the at least one computing device processor, cause the system to:
receive a query associated with a plurality of visual attributes;
determine, from the query, respective query feature values corresponding to the plurality of visual attributes;
query a plurality of databases corresponding to the plurality of visual attributes using the respective query feature values, the plurality of databases each having a plurality of feature values corresponding to the respective visual attribute of a plurality of items;
compare the query feature values to the corresponding feature values of the plurality of items for the plurality of visual attributes;
determine attribute similarity scores of the plurality of items for the plurality of visual attributes;
determine overall similarity scores for the plurality of items, respectively, based on the respective attribute similarity scores of the plurality of items; and
determine one or more results from the respective results to display in response to the query based on the overall similarity scores of the plurality of items.

17. The system of claim 16, wherein the instructions when executed further cause the system to:
generating the database, wherein the plurality of items in the database are associated with respective image data;
determining portions of the image data associated with the plurality of visual parts; and
extracting the respective feature values of the plurality of visual attributes from the portions of the image associated with the plurality of visual attributes.

18. The system of claim 17, wherein the instructions when executed further cause the system to:
identifying points in the respective image data corresponding to parts of a human body, wherein individual portions of the image data associated with the plurality of visual parts are defined by one or more of the points.

19. The system of claim 16, wherein the instructions when executed further cause the system to:
determining the plurality of query feature values from image data providing representations of one or more items.

20. The system of claim 18, wherein the image data is uploaded from a client device, captured using a camera of the client device, or pointed to via a link provided from the client device.

* * * * *